United States Patent
Klein et al.

(10) Patent No.: US 11,029,719 B2
(45) Date of Patent: Jun. 8, 2021

(54) CONTROL ARRANGEMENT CONSISTING OF AN ACTUATING ELEMENT WITH AN INPUT SURFACE AND ROTARY ACTUATOR ARRANGED ON SAID INPUT SURFACE

(71) Applicant: PREH GMBH, Bad Neustadt a. d. Saale (DE)

(72) Inventors: Markus Klein, Salz (DE); Michael Schubert, Coburg (DE); Benedikt Schmidt, Bad Neustadt a.d. Saale (DE)

(73) Assignee: PREH GMBH, Bad Neustadt a.d. Saale (DE)

( * ) Notice: Subject to any disclaimer, the term of this patent is extended or adjusted under 35 U.S.C. 154(b) by 110 days.

(21) Appl. No.: 15/766,173

(22) PCT Filed: Oct. 27, 2016

(86) PCT No.: PCT/EP2016/075931
§ 371 (c)(1),
(2) Date: Apr. 5, 2018

(87) PCT Pub. No.: WO2017/072232
PCT Pub. Date: May 4, 2017

(65) Prior Publication Data
US 2018/0314357 A1    Nov. 1, 2018

(30) Foreign Application Priority Data
Oct. 30, 2015   (DE) ............... 10 2015 118 587.3

(51) Int. Cl.
*G06F 3/041* (2006.01)
*G05G 5/03* (2008.04)
(Continued)

(52) U.S. Cl.
CPC ............... *G05G 5/03* (2013.01); *B60K 35/00* (2013.01); *G06F 3/016* (2013.01);
(Continued)

(58) Field of Classification Search
None
See application file for complete search history.

(56) References Cited

U.S. PATENT DOCUMENTS 8,994,666 B2 *  3/2015  Karpfinger ............ G06F 3/0488
                                                  345/173
9,158,390 B2 * 10/2015  Petersen ................ A63F 13/98
(Continued)

FOREIGN PATENT DOCUMENTS

CN        101544232 A     9/2009
DE     102009006260 A1   10/2009
(Continued)

OTHER PUBLICATIONS

First Office Action for Chinese Patent Application No. 2016800638043, dated Jul. 2, 2019, CNIPA.

*Primary Examiner* — Brian M Butcher
(74) *Attorney, Agent, or Firm* — M&B IP Analysts, LLC

(57) ABSTRACT

The present disclosure relates to an operating assembly consisting of a carrier, an actuating element that is mounted movably relative to the carrier and so as to return into a rest position and which defines an input surface and has a detector for detecting a touch occurring on the input surface, and of at least one rotary adjuster, which is disposed on the input surface and is mounted rotatably relative to the input surface, and of a matrix of force sensors between the carrier and the actuating element, and of an evaluator, which is configured for carrying out a positional determination of a touch that has occurred on the input surface from the signal obtained by the detector, and for identifying at least one action of the actuating force on the rotary adjuster based on the signals of the matrix of force sensors by a comparison with predetermined values.

13 Claims, 3 Drawing Sheets

(51) Int. Cl.
  G06F 3/01 (2006.01)
  G06F 3/045 (2006.01)
  G06F 3/0354 (2013.01)
  B60K 35/00 (2006.01)
  G05G 1/08 (2006.01)
  G06F 3/044 (2006.01)
  G05G 5/05 (2006.01)

(52) U.S. Cl.
  CPC .......... *G06F 3/03547* (2013.01); *G06F 3/045* (2013.01); *G06F 3/04144* (2019.05); *B60K 2370/126* (2019.05); *B60K 2370/1438* (2019.05); *G05G 1/08* (2013.01); *G05G 5/05* (2013.01); *G06F 3/044* (2013.01); *G06F 2203/04105* (2013.01)

(56) References Cited

U.S. PATENT DOCUMENTS

| | | | | |
|---|---|---|---|---|
| 9,158,422 | B2 * | 10/2015 | Craig | B60K 37/06 |
| 9,164,595 | B2 * | 10/2015 | Petersen | G06F 3/039 |
| 9,829,994 | B2 * | 11/2017 | Oh | G06F 3/04886 |
| 9,880,643 | B1 * | 1/2018 | Park | G06F 3/0393 |
| 10,198,172 | B2 * | 2/2019 | Choi | G06F 3/0488 |
| 2008/0238879 | A1 | 10/2008 | Jaeger et al. | |
| 2009/0244017 | A1 * | 10/2009 | Paia | B60K 35/00 |
| | | | | 345/173 |
| 2014/0042004 | A1 | 2/2014 | Tseng | |

FOREIGN PATENT DOCUMENTS

| | | |
|---|---|---|
| DE | 102010010574 A1 | 9/2011 |
| DE | 112010004756 | 3/2013 |

\* cited by examiner

CONTROL ARRANGEMENT CONSISTING OF AN ACTUATING ELEMENT WITH AN INPUT SURFACE AND ROTARY ACTUATOR ARRANGED ON SAID INPUT SURFACE

This application claims priority under 35 U.S.C. § 371 to the International Application No. PCT/EP2016/075931, filed Oct. 27, 2016, and to the German Application No. 10 2015 118 587.3, filed Oct. 30, 2015, now pending, the contents of which are hereby incorporated by reference.

The present disclosure relates to an operating assembly consisting of a carrier, an actuating element, which is mounted movably relative to the carrier and defines an input surface, touch-detection means on the input surface, and at least one rotary adjuster, which is disposed on the input surface and is mounted rotatably relative to the input surface.

Operating assemblies having an actuating element defining an input surface including touch-detection means on the input surface are known, for example, as touchpads or, if the input surface is congruent with a display surface, as a touchscreen. Due to the variety of inputting options possible with such operating assemblies, and in particular due to the possibility of enabling coordinate-related inputting and controlling, such operating assemblies are increasingly used in a variety of ways. Because of the generally planar and homogeneous design of these input surfaces, a haptic feedback is often lacking, which facilitates operation if a visual check during the input process is not possible, as is the case, for example, in a vehicle. For reasons related to an improved haptic feedback, there is basically still a need for classic input devices, such as buttons, rocker switches and, in particular, rotary adjusters. Due to the increasing size of the input surface of touchscreens or touchpads in connection with the accompanying minimization of costs, there is therefore the option of constructionally integrating a rotary adjuster into the touchpad or touchscreen, with the touch-detection means of the touchpad or touchscreen preferably being used for the position detection of the rotary adjuster. In this case, however, there is the problem that an actuation of the rotary adjuster is also supposed to be detected reliably.

Against this background, there was a need for a solution in which a generic operating assembly, e.g. as a combination of a rotary adjuster and a touchpad or touchscreen, can be reliably detected, and in which, in particular, a pushing function can also assign to this rotary adjuster. This object is achieved by an operating assembly according to claim 1. An equally advantageous use is the subject matter of the use claim; an equally advantageous evaluation method is the subject matter of the independent process claim. Advantageous embodiments are in each case the subject matter of the dependent claims. It must be noted that the features cited individually in the claims can be combined with each other in any technologically meaningful manner and represent other embodiments of the present disclosure. The description, in particular in connection with the figures, additionally characterizes and specifies the present disclosure.

The present disclosure relates to an operating assembly consisting of a carrier and an actuating element, which is mounted movably relative to the carrier. Furthermore, the mounting is designed to effect a neutral position, a non-actuated rest position. The actuating element defines an input surface and, moreover, touch-detection means are provided on the input surface, which are at least partially an integrative component of the actuating element; hereinafter, they are also referred to as a touch sensor system. However, the input surface is, for example, but not necessarily, planar. The actuating element is preferably mounted so as to be movable at least in the direction perpendicular to the input surface.

According to the present disclosure, at least one rotary adjuster, which is disposed on the input surface, and thus on the actuating element, and which is rotatably mounted relative to the input surface, is provided. For example, a rotary adjuster is understood to be an input device with an actuating knob or actuating ring rotatably mounted about an axis substantially perpendicular to the input surface, wherein the displacement distance of the actuating ring or actuating knob can be unlimited or provided with stops.

According to the present disclosure, a matrix of force sensors is also provided between the carrier and the actuating element for measuring an actuating force acting upon the actuating element, which is hereinafter referred to in short as an actuating force sensor system or force sensor system. A matrix according to the present disclosure is understood to be an assembly of two or more force sensors. However, an assembly of more than two sensors in a common plane, for example, is not necessarily understood to be a matrix of force sensors according to the present disclosure. With respect to the measuring principle relating to the force sensors, the operating assembly according to the present disclosure is not limited, and force sensors measuring piezo-electrically or capacitively or inductively or resistively, for example, are included in the present disclosure.

According to the present disclosure, there is also provided an evaluation unit, which is designed to carry out a positional determination of a touch that has occurred on the input surface from the signal obtained by the touch-detection means, and for identifying at least one action of the actuating force on the rotary adjuster based on the signals of the matrix of force sensors, by a comparison with predetermined values or a difference of the signals of different sensors of the matrix, for example. For example, a touch upon and an actuation of the rotary adjuster is identified based on an action of the actuating force exclusively on the actuating element detected by the force sensors, without a touch being detected on the input surface or at least in the area of the input surface not covered by the rotary adjuster or adjusters. For example, the force sensors are arranged in such a way that they detect an action of a force taking place in the direction of the degree of freedom resulting from the mounting of the actuating element. Preferably, the force sensors are oriented in such a way that they detect substantially a component of the action of the actuating force perpendicular to the input surface.

An actuation of the rotary adjuster is understood to be an actuation accompanied by an action of a force that can be detected by the matrix of force sensors. The identification of this action of forces results in several advantages of the present disclosure; for example an intentional displacement of the rotary adjuster can be distinguished more reliably from an inadvertent one, due to the inventive minimum agreement in the action of forces when the rotary adjuster is displaced simultaneously or subsequently. An intentional displacement is understood to be such an action by the operator on the rotary adjuster whose aim is the deliberate accomplishment of a change of position of the actuating element (ring of knob) of the rotary adjuster, and what, according to the present disclosure, is understood to be an actuation in the sense of the present disclosure. It was found that such actions caused by actuation can be easily and reliably detected by means of a force pattern defined by a matrix of few force sensors, and can be reliably distinguished from other actions of forces that are inadvertent and random. Thus, the displacement of a rotary adjuster caused by an actuation can be verified, and the reliability of the positional evaluation of the rotary adjuster can be enhanced.

Furthermore, according to another embodiment, the positive detection of an action of the actuating force on the rotary adjuster advantageously serves for providing the rotary adjuster with a new switching function or controlling function, which is dependent on the actuating force, e.g. on the direction and/or the amount of the actuating force measured by the matrix of the force sensors, in addition to the rotary displacement. For example, it is provided that an additional switching function or controlling function is assigned to the rotary adjuster, given an actuating force occurring in a direction perpendicular to the axis of the rotary displacement. For example, one switching function or controlling function is respectively assigned to each of four directions of the actuating force that are orthogonal to one another and to the axis of rotary displacement, in order to provide the rotary adjuster with, for example, the functionality of a joystick in addition to the rotating function. In another embodiment, it is provided that an additional switching function or controlling function is assigned to the rotary adjuster, given an actuating force occurring in a direction parallel to the axis of the rotary displacement. For example, the rotary adjuster is thus provided with an additional pushing function. It is the responsibility of the person skilled in the art to select a suitable arrangement of the matrix of force sensors and number of force sensors, as well as suitable threshold values in the evaluation of the measured actuating force in order to ensure a reliable detection for the additional switching or controlling function.

According to a preferred embodiment, the means for touch detection are designed to detect a touch capacitively and/or resistively. For example, the input surface is associated with an electrode structure consisting of several electrodes for generating measuring capacitances in order to detect a spatially resolving detection, which approximately corresponds to the size of the electrodes, of a change of capacitance caused by a touch on the input surface.

Preferably, the touch-detection means are also designed to detect an approach towards and/or touch on the rotary adjuster. This is provided in one embodiment in order to enable the measurement of forces by means of the matrix of force sensors. In another embodiment, the actuation of the rotary adjuster identified by means of the actuating force measurement is thus verified. In addition, there is the possibility of providing a preview on a display of the functionality provided with the rotary adjuster, before the actual actuation triggering the function, e.g. the displacement, is carried out, for example. In the case of an approach towards the rotary adjuster, or of a touch on it at the latest, a scale which surrounds the rotary adjuster and is relevant to the function connected to the displacement is, for example, shown on a display disposed below the input surface.

More preferably, the touch-detection means are designed to enable a spatially or at least regionally resolving detection of the touch on the rotary adjuster. For example, a surface of the rotary adjuster, e.g. the surface facing towards the operator, defines several specific touch regions, the touching of which is detected independently of one another. For example, the touch regions are connected in an electrically conductive manner to a transmitting electrode, which influences the respective measuring capacitance of the input surface when touched, in order thus to enable a detection by means of the touch-detection means. Due to the regionally accurate resolution, the quality of verification can be improved because, for example, the direction of the actuation force can be verified with the specific touch region.

According to another embodiment, the operating assembly according to the present disclosure further comprises an actuator for the impulse or vibration excitation of the actuating element relative to the carrier, in order to generate a haptic feedback for the operator. For example, a piezoelectric or electromagnetic actuator is provided. A haptic feedback is provided particularly if an action of the actuating force on the rotary adjuster is positively identified. For example, the actuator is designed in such a way that the impulse or vibration excitation caused by it occurs in a direction perpendicular to the input surface, or the direction of the impulse or vibration excitation intersects the input surface at an acute angle. Preferably, the impulse or vibration excitation occurs in a direction passing through the center of gravity of the actuating element. Preferably, the actuator is designed to cause an impulse or vibration excitation in a direction parallel to the input surface.

According to another embodiment, the evaluation unit is designed to verify the touch detection, i.e. the detection of a touch, on the input surface based on the signal of the touch-detection means using the signals of the matrix of force sensors and/or vice versa. This may relate, for example, to the verification of the touch as such, but, depending on the resolving power of the force sensor system defined by the matrix of force sensors, also to the verification of the location of the touch. Conversely, in one embodiment, it is possible, for example, to verify an actuation of the rotary adjuster in the case of a detection of an action of a force on the rotary adjuster and the absence of a touch at least in some regions of the input surface. Conversely, the verification of the touch and/or actuation of the rotary adjuster can be verified by a detection of a touch in a region immediately surrounding the rotary adjuster, e.g. with a width of the thickness of a finger, because this touch can be associated only with a touch on the rotary adjuster with a finger position grasping the actuating ring or actuating knob, and not with a random touch.

Preferably, the touch-detection means are also designed to detect a position and/or displacement of the rotary adjuster. For example, a position transmitter is provided, which touches or almost touches the touch surface, influences the respective measuring capacitance and thus replaces a human finger, and rotates synchronously with the actuating ring or actuating knob. For example, the touch-detection means extend between the touch-detection means and the actuating element.

According to another preferred embodiment of the operating assembly according to the present disclosure, the latter further has a display, and the evaluation unit is designed to change a display content in the event of an identification of an action of the actuating force on the rotary adjuster. Thus, a visual feedback is provided, for example. Preferably, the display is a component of the actuating element. Viewed from the operator, the display is disposed under the input surface, for example.

According to a preferred version, the actuating element has an outer layer which defines the input surface and which is formed integrally with a base of the rotary adjuster or is connected with the base non-positively and/or by substance-to-substance connection and/or positively. According to a preferred embodiment, this preferably transparent layer is a glass layer, preferably a glass layer with a linear thermal expansion coefficient at 20° of between 3.2 and $8.7 \times 10^{-6}$/K, more preferably made from borosilicate glass, aluminosilicate glass or soda-lime float glass. Such glass layers are easy to process in a forming process by heating the glass layer above the transformation temperature in a forming process. Moreover, such a glass layer has a high level of strength and haptic properties perceived to be particularly advantageous. For example, the thickness of the layer is 0.5 mm to 2.0 mm, such as 1.1 mm. The base is glued or connected by latching engagement to the layer defining the input surface, for example. The portion which is stationary when the actuating ring or knob is rotationally displaced and the portion of the rotary adjuster which is provided for adjacent arrangement with respect to the input surface, is the base, for example.

Furthermore, the present disclosure relates to the use of the previously described operating assembly in any one of its configurations in a motor vehicle. For example, the operating assembly is disposed in a center console of the motor vehicle.

The present disclosure relates to an evaluation method for an operating assembly in any one of the previously described configurations, wherein the evaluation method comprises a touch-detection step, in which, from the signal obtained by the means for touch detection, a positional determination of a touch that has occurred on the input surface is carried out, and the evaluation method comprises an actuation identification step, in which at least one action of the actuating force on the rotary adjuster is identified based on the signals of the matrix of force sensors, e.g. by means of a comparison with predetermined values.

For example, the actuation force identification step serves for distinguishing an actuation from an inadvertent rotation due to random contact. It was found that such actions caused by actuation can be easily and reliably detected by means of a force pattern defined by a matrix of few force sensors, and can be reliably distinguished from other actions of forces that are inadvertent and random. Thus, the displacement of a rotary adjuster caused by an actuation can be verified, and the reliability of the positional evaluation of the rotary adjuster can be enhanced.

According to another embodiment of the method, the positive detection of an action of the actuating force on the rotary adjuster is associated with a new switching function or controlling function, which is dependent on the actuating force, e.g. on the direction and/or the amount of the actuating force measured by the matrix of the force sensors. For example, it is provided that an additional switching function or controlling function is assigned to the rotary adjuster, given an actuating force occurring in a direction perpendicular to the axis of the rotary displacement. For example, one switching function or controlling function is respectively assigned to each of four directions of the actuating force that are orthogonal to one another and to the axis of rotary displacement, in order to provide the rotary adjuster with the functionality of a joystick in addition to the rotating function. In another embodiment, it is provided that an additional switching function or controlling function is assigned to the rotary adjuster, given an actuating force occurring in a direction parallel to the axis of the rotary displacement. For example, the rotary adjuster is thus provided with an additional pushing function.

The present disclosure is explained further with reference to the following figures. The Figures are to be understood only as examples and merely represent a preferred embodiment. In the figures.

Figure 1:
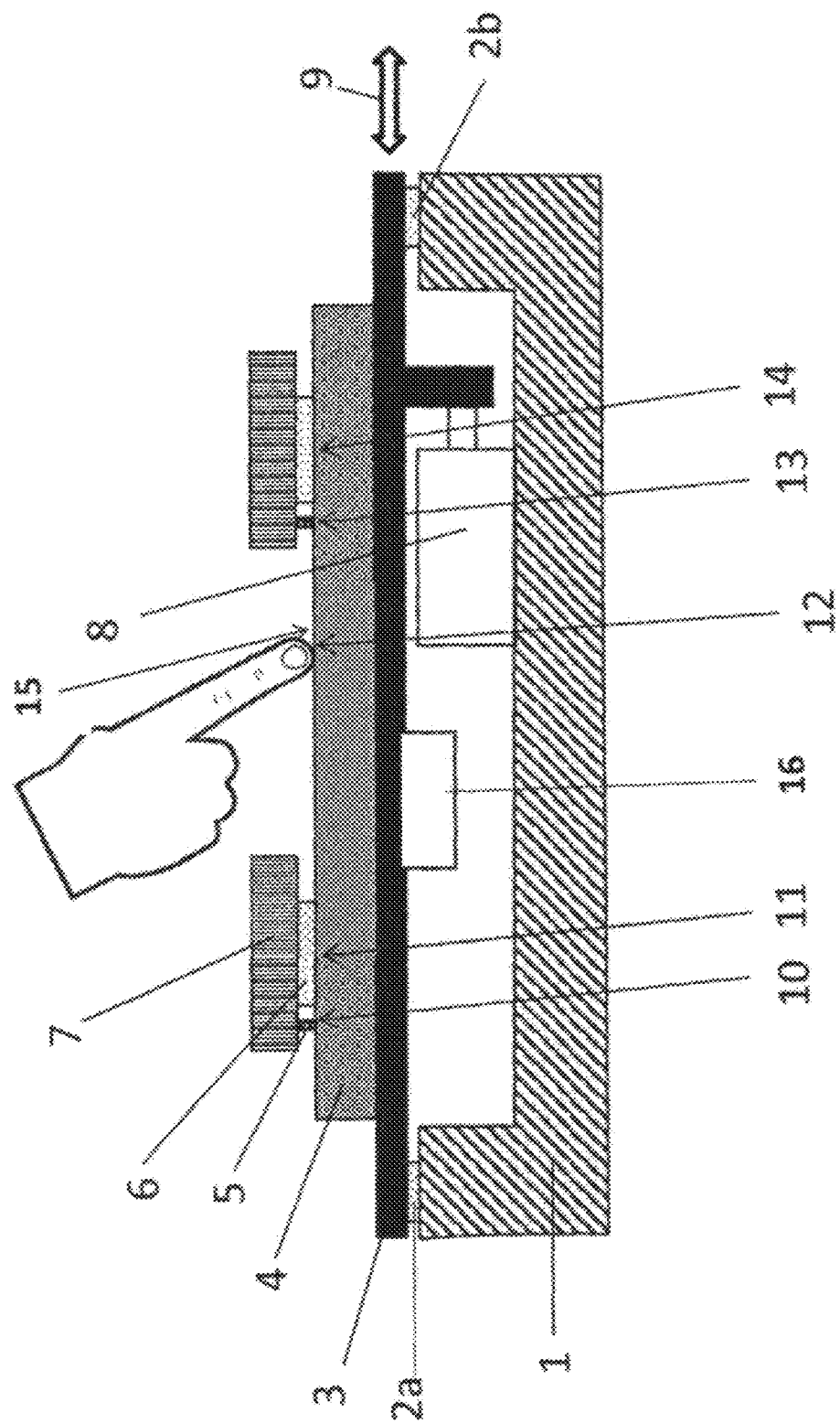
FIG. 1 shows a sectional view of an embodiment of an operating assembly according to the present disclosure.

FIG. 1 shows a first embodiment of the operating assembly according to the present disclosure. According to the present disclosure, the operating assembly comprises a carrier 1. An actuating element 3, 4, which defines an input surface 15 and has means 4 for detecting a touch on the input surface, is movably attached to the carrier 1. In the present case, this is a touchscreen 4, i.e. an electronic display, which defines a touch-sensitive input surface 15, with touch-detection means. The mounting means, which are not shown in more detail, are configured in such a way that a return of the actuating element 3, 4 into a rest position shown in FIG. 1 is caused. A touch on the input surface 15, as indicated at the point 12, is capacitively detected in a spatially resolving manner by an electrode structure of the touchscreen 4 not shown, by evaluation of a matrix of measuring capacitances sensing the input surface. Furthermore, several rotary adjusters 7 with an actuating ring for the rotational displacement of the rotary adjuster 7 are provided on the outermost transparent layer of the touchscreen 4 facing towards the operator and defining the touch-sensitive input surface 15. In each case, the rotary adjuster 7 has a base 6 glued to the outermost layer of the touchscreen 4 so that the rotary adjusters 7 can be moved with the actuating element 3, 4.

The rotary adjusters 7 cover a part of the input surface 15 of the touchscreen 4, wherein the sensor system for touch detection (touch detection system) provided in the touchscreen 4 can be used for the position detection of the rotary adjuster 7. A position transmitter 5 that is displaced synchronously with the actuating ring cooperates with the touchscreen 4, in particular with the touch-detection means thereof, so that the position of the rotary adjuster 7 can be detected by means of the detection means associated with the touchscreen 4. This is an electrically conductive position transmitter 5, which influences certain measuring capacitances of the touchscreen 4 in accordance with the position of the rotary adjuster and its own position and trajectory, from which the positional information can be determined by an evaluation unit 16, and thus a position of the respective rotary adjuster 7 is associated with the locations 10 or 13. An additional electrode may also be integrated into the rotary adjuster 7, in particular in its actuating ring, in order also to be able to detect an approach towards or a touch on the rotary adjuster 7 by means of the touch sensor system of the touchscreen 4.

An electromagnetic actuator 8 is attached to the carrier 1. It has an operative direction extending parallel to the input surface 15 in order to vibratingly drive the actuating element 3, 4 in that direction for the generation of a haptic feedback 9. A matrix of several capacitively measuring force sensors 2a, 2b, two of which are shown in FIG. 1, is provided between the carrier 1 and the actuating element 3, 4 for measuring an action of the actuating force on the actuating element 3, 4 and on the rotary adjusters 7 connected thereto. The force sensors 2a, 2b are arranged and oriented in such a way that they substantially measure the component of an actuating force standing vertically on the input surface 15. The matrix of force sensors 2a, 2b is connected in an electrically conductive manner to the evaluation unit 16. Thus, the evaluation unit 16 is capable of carrying out a spatially resolving detection of the action of the actuating force by means of a comparison with predetermined threshold values, and thus of associating the location of the action of the actuating force with the points 11 and 14, and thus with the rotary adjusters 7. The evaluation unit 16 is capable of verifying the positional information obtained by means of the touch detection of the touchscreen 4 with the positional information obtained from the action of the actuating force and by means of the matrix of force sensors 2a, 2b. If a location of action of an actuating force is associated with the region of one of the rotary adjusters 7, for example based on the signal of the matrix of force sensors 2a, 2b, this is positively confirmed and thus verified by no touch being detected by the touchscreen 4 in the region outside the region covered by the rotary adjusters 7, and vice versa. If the measured force matrix corresponds at least approximately to a predetermined matrix, the actuation associated with the respective rotary adjuster 7, in this case the pushing of the rotary adjuster 7, is assigned a switching function, and a haptic feedback is generated almost simultaneously by means of the actuator 8.

Figure 2:
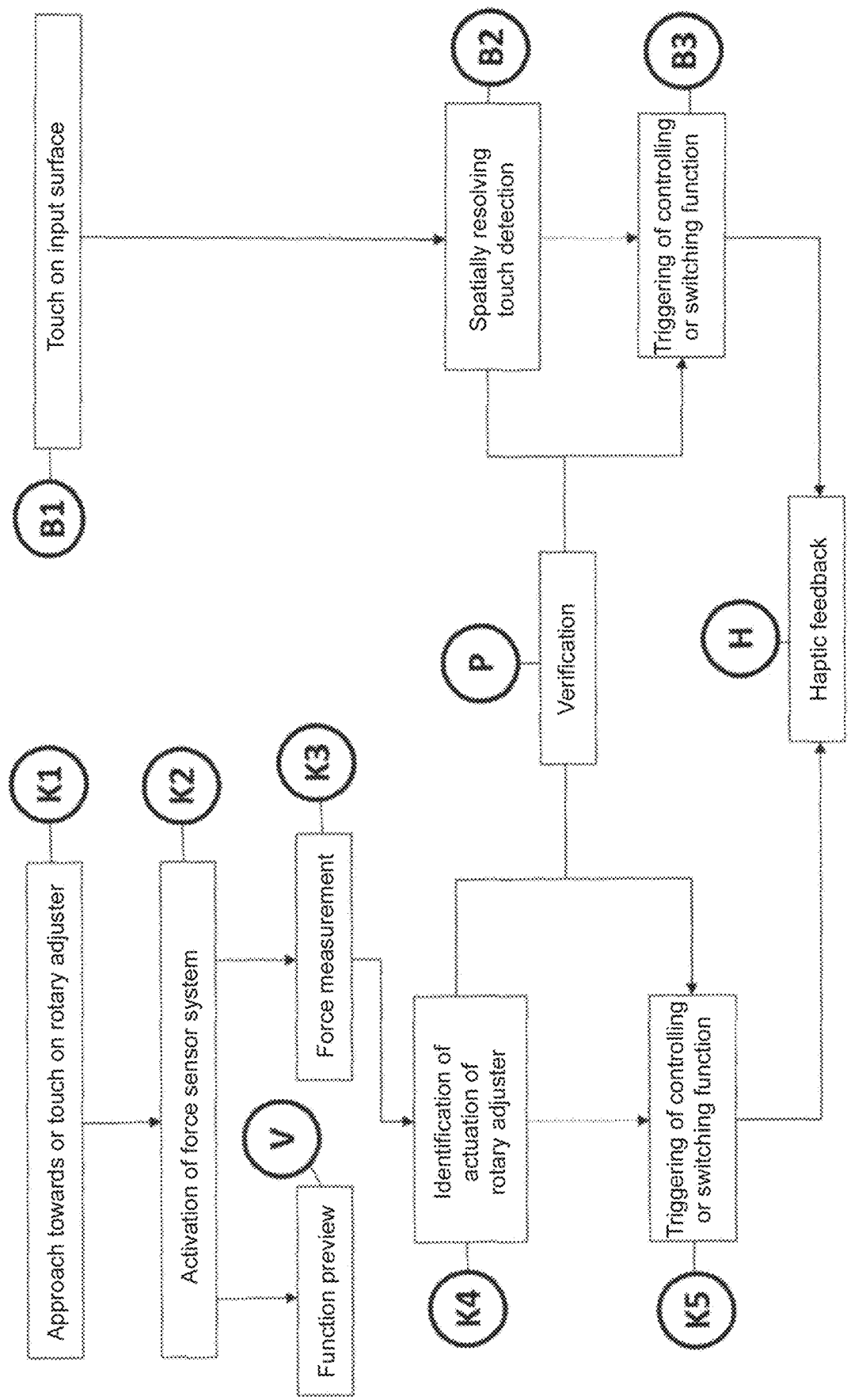
FIG. 2 is a schematic view of a process sequence according to the present disclosure.

These and other aspects are explained below with reference to the flow chart of FIG. 2. In step K1, a touch on or approach towards one of the two rotary adjusters 7 from FIG. 1 is detected by means of the electrode respectively integrated into the rotary adjuster 7 and the means for the capacitive spatially resolving touch detection of the touchscreen 4. Then, a force measurement is carried out in step K2 by means of the force sensor system, i.e. the matrix of force sensors 2a, 2b. At the same time, a functional preview of the switching function that can be obtained with the rotary adjuster 7, in this case when it is pressed down, is carried out in step V on the display provided by the touchscreen 4. In step K3, an action of a force is measured if a minimum action of a force is exceeded, and in step K4, this is evaluated by the evaluation unit 16, e.g. based on the difference of the signal values of the sensors 2a and 2b, as to whether or not the location of the action 11, 14 resulting therefrom can be associated with one of the rotary adjusters 7. If that is the case, the switching function is immediately triggered in step K5 in a simple embodiment expressed by the dashed arrow. In a preferred embodiment of the method, this result is verified in step P with a measurement result of the touch sensor system of the touchscreen obtained in steps B1 and B2. If, for example, no touch can be detected in step B2, the actuation of the rotary adjuster 7 is thereby verified in step 4. The switching function is triggered in step K5 only after verification, and a haptic feedback is generated by the actuator 8 in step H. If the rotary adjuster 7 does not include any device that permits the detection of a touch or approach, K1 is omitted. In that case, the verification in step P takes place by a force threshold being exceeded in step K3, but no touch being detected in step B2, or at least by a touch being detected in step B2 exclusively in the immediate vicinity (width of a finger) of the rotary adjuster 7.

A touch by the operator on the input surface 15 outside the region covered by the rotary adjuster 7 and the detection thereof is described below. If a touch on the input surface 15 occurs in step B1 in the region not covered by the rotary adjusters 7, it is detected by the touch sensor system of the touchscreen 4 in step B2 and, in an embodiment shown by the dashed arrow, results in the triggering of a switching function in step B3 if it matches a predetermined touch pattern; and a haptic feedback is generated by the actuator 8 in step H.

Preferably, the triggering of the switching function in step B3 requires a verification P of the touch measured in step B2 by means of the measurement result obtained in steps K3 and K4 of the matrix of force sensors 2a, 2b, which is referred to as a force sensor system. If, for example, a simultaneous actuating force could not be associated to the location of any of the rotary adjusters 7, the touch on the touchscreen 4 outside the region covered by the rotary adjusters 7 is thus verified.

Figure 3:
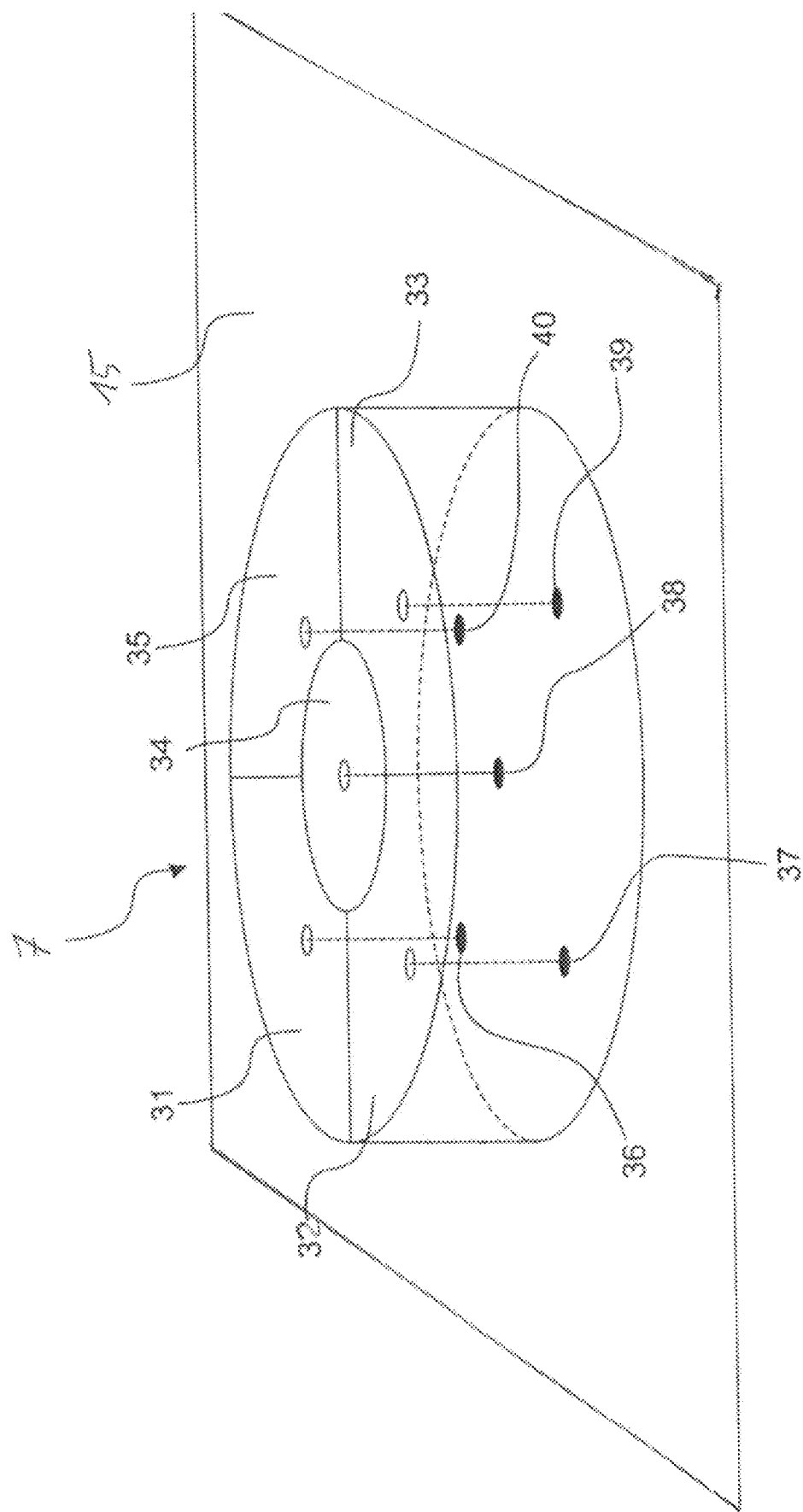
FIG. 3 is a view of another embodiment of a rotary adjuster according to the present disclosure of the operating assembly.

FIG. 3 shows another embodiment of an operating assembly according to the present disclosure, with a rotary adjuster 7 modified in comparison with the previous embodiment. The rotary adjuster 7 is disposed on the side of the touch-sensitive input surface 15 facing towards the operator. On its surface, the rotary adjuster 7 defines several regions 31, 32, 33, 34, 35 suitable for touch or approach detection, due to the fact that electrically conductive, mutually insulated electrodes 31, 32, 33, 34 are disposed in the surface or underneath the surface of the rotary adjuster. The electrodes 31, 32, 33, 34, 35 are each connected with an associated transmitting electrode 36, 37, 38, 39, 40 in an electrically conductive manner. A touch on the regions 31, 32, 33, 34, 35 is capable, by means of the transmitting electrodes 36, 37, 38, 39, 40 in cooperation with the touch sensor system, which is associated with the input surface 15 and not shown in FIG. 3, of detecting a regional resolution of a location of a touch on the rotary adjuster 7. For example, different functions can be assigned to the different touch regions 31, 32, 33, 34, 35. For example, if the region disposed in the center of the rotary adjuster 30 is touched while an actuating force acting upon the rotary adjuster 7 is simultaneously verified, a pushing function may be triggered. For example, if a region 31, 32, 33, 35 located at the outer edge of the rotary adjuster 7 is touched with a simultaneous verification by the force sensor system, a switching function dependent on the actuating direction may be triggered, so that the joystick function verified by the force sensor system is associated with its direction-specific functionality by the specific touch region. For example, the regional resolution of the touch serves for specifying the switching function of the rotary adjuster 7. If the location of the touch lies in a region around the geometric center of the rotary adjuster 7, a pushing function is triggered. If the location of the touch is, for example, outside a region of the rotary adjuster 7 surrounding the center, a direction-dependent function is triggered.

The invention claimed is:

1. An operating assembly comprising:
   a carrier;
   an actuating element that is mounted movably relative to the carrier and configured to return into a rest position, and which defines an input surface and has a detector for detecting a touch occurring on the input surface;
   at least one rotary adjuster disposed on the input surface and is mounted rotatably relative to the input surface, wherein the rotary adjuster is configured with a controlling function given an actuating force occurring in a direction parallel to an axis of rotary displacement of the rotary adjuster;
   a matrix of force sensors between the carrier and the actuating element for measuring an actuating force acting upon the actuating element; and
   an evaluator, which is configured to verify by comparing a positional determination of a touch on the input surface from the signal obtained by the detector, with a location of the actuating force on the rotary adjuster determined based on the signals of the matrix of force sensors,
   wherein the evaluator is configured to switch control from the input surface to the at least one rotary adjuster, based on the verification of the actuating force on the rotary adjuster in the direction parallel to the axis of the rotary displacement of the rotary adjuster.

2. The operating assembly of claim 1, wherein the detector is designed to detect a touch capacitively or resistively.

3. The operating assembly of claim 1, wherein the detector is designed to detect an approach towards or touch on the rotary adjuster.

4. The operating assembly of claim 1, wherein the detector is designed to detect an approach towards or touch on the rotary adjuster in a spatially or regionally resolved manner.

5. The operating assembly of claim 1, further comprising:
an actuator for an impulse or vibration excitation of the actuating element relative to the carrier to generate a haptic feedback.

6. The operating assembly of claim 5, wherein the actuator is designed to cause an impulse or vibration excitation in a direction parallel to the input surface.

7. The operating assembly of claim 1, wherein the evaluator is designed to verify the touch detection on the input surface based on the signals of the matrix of force sensors.

8. The operating assembly of claim 1, wherein the detector is designed to detect a position or displacement of the rotary adjuster.

9. The operating assembly of claim 1, further comprising:
a display, where the evaluator is designed to change a display content in the event of an identification of an action of the actuating force on the rotary adjuster.

10. The operating assembly of claim 1, wherein the actuating element has an outer, layer which defines the input surface and which is formed integrally with a base of the rotary adjuster or is connected with the base non-positively or by substance-to-substance connection or positively.

11. The operating assembly of claim 1 configured to be employed in a motor vehicle.

12. An evaluation method for an operating assembly consisting of a carrier, an actuating element that is mounted movably relative to the carrier and so as to return into a rest position and which defines an input surface and has a detector for detecting a touch on the input surface, at least one rotary adjuster, which is disposed on the input surface and is mounted rotatably relative to the input surface, a matrix of force sensors between the carrier and the actuating element for measuring an actuating force acting upon the actuating element, and an evaluator, the evaluation method comprising:
determining a position of touch on the input surface from a signal obtained from the detector;
identifying the actuating force on the rotary adjuster based on the signals of the matrix of force sensors;
verifying by comparing the position of the touch on the input surface from the signal obtained by the detector, with a location of the actuating force on the rotary adjuster determined based on the signals of the matrix of force sensors; and
switch control from the input surface to the at least one rotary adjuster, based on the verification of the actuating force on the rotary adjuster in a direction parallel to an axis of rotary displacement of the rotary adjuster.

13. The operating assembly of claim 1, wherein the controlling function of the rotary adjuster is a pushing function.

* * * * *